United States Patent [19]

Whelpley, Jr.

[11] Patent Number: 5,659,665
[45] Date of Patent: Aug. 19, 1997

[54] METHOD AND APPARATUS FOR INCLUDING SPEECH RECOGNITION CAPABILITIES IN A COMPUTER SYSTEM

[75] Inventor: James Hall Whelpley, Jr., Chester, N.J.

[73] Assignee: Lucent Technologies Inc., Murray Hill, N.J.

[21] Appl. No.: 352,251

[22] Filed: Dec. 8, 1994

[51] Int. Cl.$^6$ .................. G10L 3/00; G10L 5/06; G10L 9/00
[52] U.S. Cl. ............ 395/2.84; 395/2.55; 395/2.79
[58] Field of Search .................. 395/2.84, 2, 2.79, 395/2.4, 2.55; 381/42–45

[56] References Cited

U.S. PATENT DOCUMENTS

| | | | |
|---|---|---|---|
| 4,704,696 | 11/1987 | Reimer et al. | 395/2.84 |
| 4,776,016 | 10/1988 | Hansen | 381/42 |
| 4,779,079 | 10/1988 | Hauck | 345/168 |
| 4,964,075 | 10/1990 | Shaver et al. | 364/900 |
| 5,231,691 | 7/1993 | Yasuda | 395/2 |
| 5,252,951 | 10/1993 | Tannenbaum et al. | 345/156 |
| 5,386,494 | 1/1995 | White | 395/2.84 |

OTHER PUBLICATIONS

Massena, R., "Speech recognition keyboard lets you talk intead of type", Speech Technology, vol. 2, No. 3, Aug.–Sep. 1984, pp. 106–107.

*Primary Examiner*—Allen R. MacDonald
*Assistant Examiner*—Patrick N. Edouard

[57] ABSTRACT

A computer system retrofit is described which allows the inclusion of voice recognition capabilities to provide a user of a standard system not incorporating voice recognition with the ability to use voice commands when editing a document on a computer system. An apparatus that recognizes speech patterns may be inserted in a computer system as a stand alone unit that provides keystroke data to the standard keyboard cable input port of a microprocessor unit. The apparatus, based on the detection of predetermined voice commands, generates keystroke data which are equivalent to the keystroke data which would have been generated had the computer user physically depressed a corresponding sequence of keys at a keyboard.

27 Claims, 3 Drawing Sheets

5,659,665

METHOD AND APPARATUS FOR INCLUDING SPEECH RECOGNITION CAPABILITIES IN A COMPUTER SYSTEM

FIELD OF THE INVENTION

This invention relates generally to the utilization of speech recognition technology in a computer system. More particularly, the present invention relates to the incorporation of speech recognition capabilities in a computer system for providing a computer user the ability to utilize a voice command for executing operations that otherwise would require the performance of a repetitive keystroke sequence on a keyboard.

BACKGROUND OF THE INVENTION

In present computer systems, a computer user may introduce information into or delete information from a document, such as, for example, a word processing or spread sheet document, and select the position in the document where the insertion or deletion is to occur, by physically depressing the appropriate keys on a keyboard or other similar keystroke device which is connected in a conventional manner to a microprocessor unit in the computer system. A cursor displayed on a video display terminal which is typically attached to the microprocessor unit provides a visual display of the document to assist the user in performing the desired keystroke sequences associated with editing and cursor movement in the document.

During the course of editing a document, a computer user frequently executes similar keystroke sequences, each of which involve the repeated depression of an individual key on the keyboard. For example, the user must physically depress the right arrow key, "→", on the keyboard a multiplicity of times each time that the user desires to move the cursor a few spaces to the right within the same text line. A keyboard macro or function key is neither practical nor useful for reducing the number of keystroke depressions performed in common editing tasks, such as, for example, moving the cursor from ten to twenty places along the same text line or adding ten to twenty blank lines to a document.

Currently, some computer systems are being manufactured to include speech or voice recognition capabilities in the microprocessor unit. These systems allow the user to utilize voice commands for performing certain editing and cursor movement tasks without executing a repetitive keystroke sequence on a keyboard.

The implementation of voice recognition technology in a computer system not originally manufactured with voice recognition capabilities, however, typically will require that high cost memories be added to the microprocessor unit to satisfy the software needs associated with voice recognition application programs. Furthermore, additional hardware such as a microphone, speech processor and a suitable input to the microprocessor unit typically must be added to an older computer system in order to provide for the capability of speech recognition.

Thus, owners of these older computer systems presently cannot take advantage of voice recognition techniques for operating on a document without incurring the high cost and inconvenience of purchasing a new system or upgrading the capabilities of their existing systems. Therefore, a need exists for a low cost apparatus that may be easily installed in older computer systems which were not originally fabricated with the necessary features required for performing voice recognition and which could not perform voice recognition tasks without the addition of new connections and components.

SUMMARY OF THE INVENTION

One embodiment of the present invention is an apparatus that may be inserted into the keystroke data path between a keyboard and a microprocessor unit in a computer system to provide voice recognition capabilities to that system. The apparatus according to the present invention is preferably a self-contained, stand alone unit having an input port which may be connected by a keyboard cable to a standard output port of the keyboard, and an output port which may be connected to a standard keyboard cable input port of the microprocessor unit by a standard computer cable that is similar in construction and operation to the keyboard cable. The apparatus further comprises electrical speech detection and processing components allowing for the detection and processing of speech information.

In accordance with other aspects of the present invention, the speech processing components in the apparatus compare the patterns of detected speech information to speech patterns of predetermined voice commands associated with repetitive keystroke sequences which may be performed at the keyboard. If a match is found, the speech processing components generate keystroke data which are equivalent to that which would have been generated at the keyboard had the user physically depressed a key on the keyboard a multiplicity of times in sequence.

The apparatus may also combine the keystroke data originating from the keyboard and that generated upon the detection of voice commands to provide a stream of interleaved voice and keyboard keystroke data for routing from the output port of the apparatus to the keyboard cable input port of the microprocessor unit.

In a further embodiment, the necessary electrical components for performing the speech detection and processing functions described above may be included in a keyboard to enable that voice recognition capabilities may be provided to an existing computer system by connecting that keyboard, using a standard keyboard cable, to the keyboard cable input port of the microprocessor unit.

Further advantages of the present invention will be readily apparent from the detailed description and the drawings that follow.

DETAILED DESCRIPTION

The present invention is a method and apparatus for providing speech recognition capabilities to a computer system. In a first embodiment, an apparatus according to the present invention, hereinafter called a voice command device, may be inserted into the keystroke data path between a keyboard and a keyboard cable input port of a microprocessor unit of a computer system. The voice command device operates to provide to the keyboard cable input port of the microprocessor unit keystroke data which may be generated at the keyboard interleaved with keystroke data representative of detected voice commands. In accordance with the present invention, the voice command device may preferably be constructed to recognize speech patterns representative of predetermined voice commands which are associated with the performance of a repetitive keystroke sequence at the keyboard.

Figure 1:
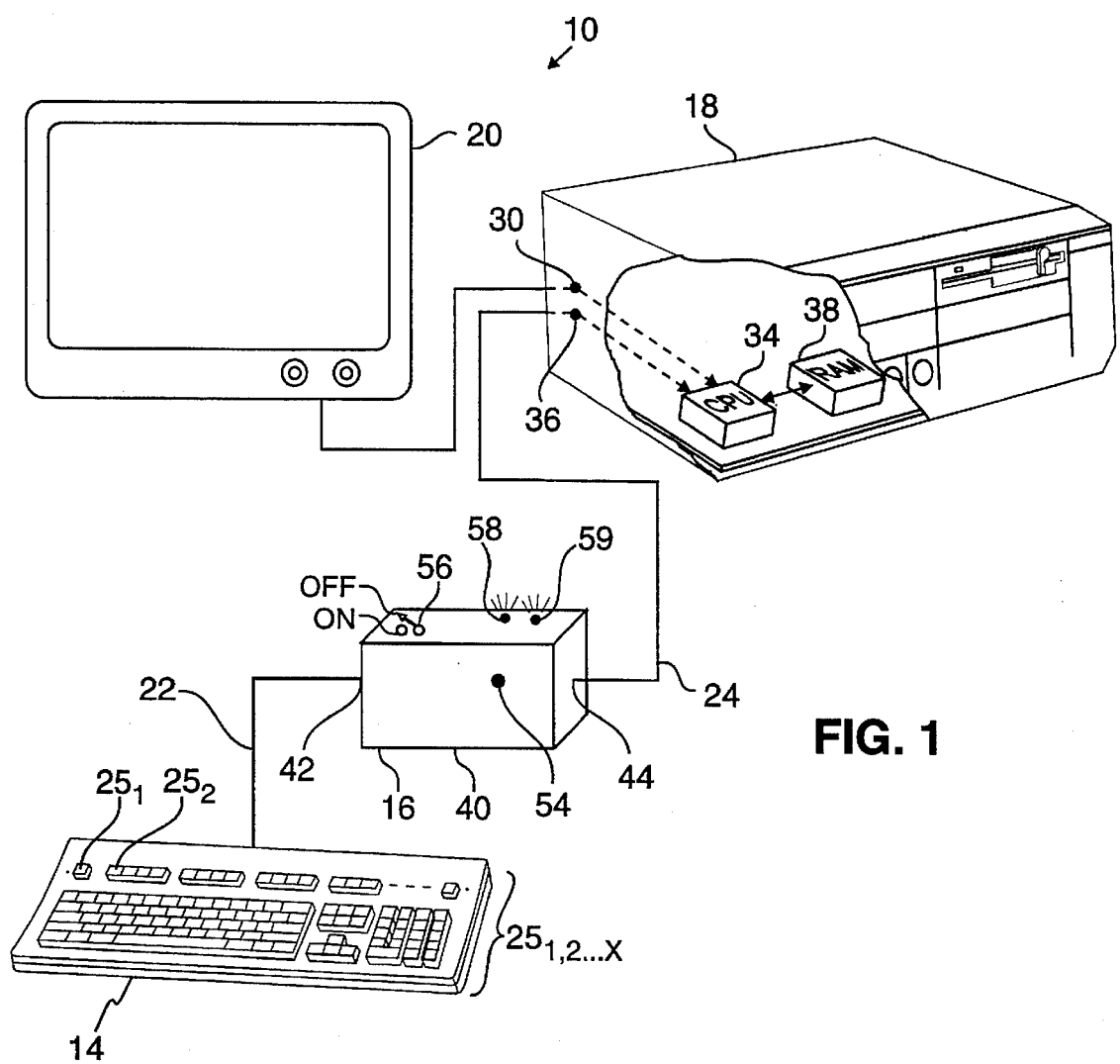
FIG. 1 illustrates a computer system including a voice command device according to the present invention.

FIG. 1 shows a computer system 10 configured according to the present invention. The system 10 comprises a standard keyboard 14, a voice command device 16, a standard microprocessor unit 18 without voice recognition, and a video display terminal 20. The system 10 is first generally described with respect to the external connections which are made from the keyboard 14 and the microprocessor unit 18 to the voice command device 16. Then, a detailed description of the construction and operation of the voice command device 16 is provided to explain the advantages of providing voice recognition capabilities to an existing computer system according to the present invention.

The keyboard 14 is a conventional keystroke device which comprises a plurality of key inputs $25_{1,2...x}$. These key inputs $25_{1,2...x}$ are electrically connected to a processing circuit, not shown, within the keyboard 14 that generates standard electronic signals, called keystroke data, according to which key input has been depressed by the user. Hereinafter, keystroke data generated at the keyboard 14 is called keyboard keystroke data. The keyboard keystroke data is externally routed from the keyboard 14 via a standard keyboard cable 22. It is to be understood that the keyboard 14 may be any standard keystroke device, such as, for example, a 101-key enhanced keyboard, which includes one or more keys that a computer user may depress, for instance, to move a cursor in a document or add or delete information to and from the document.

The microprocessor unit 18 comprises a video display port connector 30 which is connected to the video display terminal 20, and a standard keyboard cable input port connector 36. The video display port connector 30 and the keyboard cable input port connector 36 are connected internally, in a well known conventional manner, to a computer processing unit (CPU) 34 that is connected to a memory 38, such as a random access memory (RAM), which are typically included within the microprocessor unit 18.

The voice command device 16 comprises an input port connector 42 and an output port connector 44 housed in a housing 40. The connector 42 is a standard connector, and is preferably identical to that typically found at the keyboard cable input port of a microprocessor unit. The connector 44 is preferably a standard connector which may be connected to one end of a standard computer cable that has a mating connector at its opposite end which is compatible with and allows for simple connection to the connector at the keyboard cable input port of a microprocessor unit in a computer system.

In accordance with the present invention, the input port connector 42 of the voice command device 16 is connected to the end of the keyboard cable 22 which is not connected to the keyboard 14 and which, in typical operation, would be connected to the keyboard cable input port connector 36 of the microprocessor unit 18. Further, the output port connector 44 of the voice command device 16 is connected by a suitable standard computer cable 24 to the keyboard cable input port connector 36 of the microprocessor unit 18. These connections enable simple installation of the voice command device 16 to an existing computer system for upgrading that system to include voice recognition capabilities. According to the present invention, an owner of an existing computer system is required to purchase only a voice command device and one additional standard computer cable for retrofitting a computer system not having voice recognition capabilities with voice recognition features. Significant cost and convenience advantages may be realized in that internal modifications within the microprocessor unit for upgrading an existing computer system to include voice recognition need not be performed.

The voice command device 16 may be designed and manufactured inexpensively according to the inventive technique to provide a low cost solution for retrofitting a computer system to include voice recognition capabilities. As explained below, the voice command device 16 may be designed to recognize fundamental voice commands associated with frequently performed repetitive keystroke sequences and generate keystroke data representative of these keystroke sequences, based on detected voice commands, for routing to a microprocessor unit.

Figure 2:
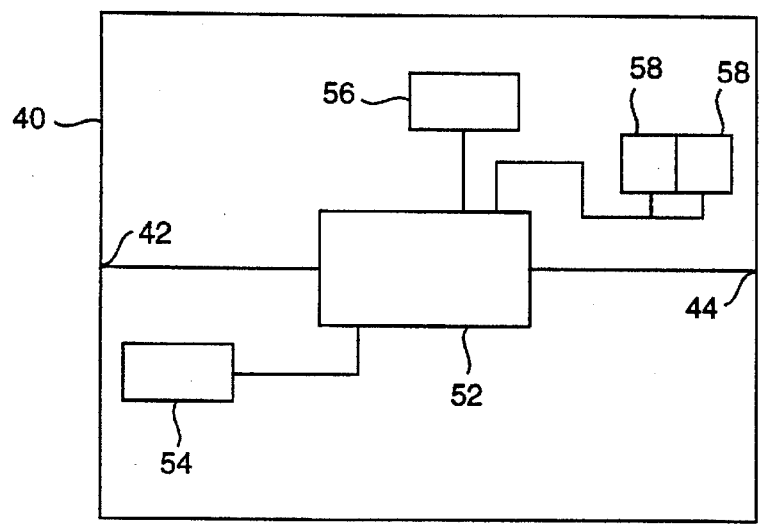
FIG. 2 is a block diagram illustrating the circuit elements and their respective interconnections which may be included in a voice command device according to the present invention.

The voice command device 16 further comprises an audio receiver 54 and an electronic processing component 52 which operate in the manner described in further detail below. As shown in block diagram form in FIG. 2, the processing component 52 is suitably connected to the input port connector 42, the output port connector 44 and the receiver 54. Further, the voice command device 16 may also comprise a manual activate switch 56 and indicator lights 58 and 59, all of which are electrically connected to the processing component 52 and operate in the manner described below.

The output port connector 44 and the processing component 52 and the internal connections from the connector 44 to the processing component 52 are preferably designed to enable the voice command device 16 to utilize the electrical power typically supplied from the keyboard cable input port connector 36 of the microprocessor unit 18 to power a keyboard for performing the various operations described below. Alternatively, a power outlet and suitable connections, not shown, to the processing component 52 may be included with the voice command device 16 to allow electrical power to be supplied to the voice command device 16 from an external source, such as, for example, a wall outlet or a dc source, such as a battery.

The audio receiver 54 in the voice command device 16 may comprise any well known device, such as an external or internal microphone, which detects speech information and generates an electrical representation of the detected speech patterns.

The switch 56 is preferably a standard component that may control whether the voice command device 16 is activated for detecting speech information, in other words, voice commands. Hereinafter, the detection of speech information corresponding to a voice command is referred to as the reception or detection of a voice command.

The voice command device 16 may be designed to function as follows in conjunction with the operation of the switch 56. If the switch 56 is placed in the "ON" position, the processing component 52 of the voice command device 16 is activated for speech detection and processing. Upon activation, the processing component 52 may detect and process voice commands; route to the microprocessor unit 18 keystroke data which may be generated from detected voice commands, called voice keystroke data, and which may be received from the keyboard 14 at the input port connector 42; and, illuminate the lights 58 and 59 in the manner explained below.

On the other hand, if the switch 56 is placed in the "OFF" position, speech detection is not performed and keyboard keystroke data received at the input port connector 42 are transmitted through the voice command device 16 to the output port connector 44 for further routing to the microprocessor unit 18. The voice command device 16, in other words, is transparent in the system 10 when the switch 56 is in the "OFF" position.

The light 58, which is preferably green in color and a standard component, may be used for indicating to the computer user that the voice command device 16 has been activated to detect and process voice commands. As stated above, the light 58 may be suitably illuminated by the processing component 52 when the switch 56 is placed in the "ON" position.

The light 59, which is preferably orange in color and a standard component, may be used for warning the user that the voice command device 16 will not generate voice keystroke data from speech information that has been previously detected. The light 59 is illuminated by the processing component 52, preferably in a flashing manner, when the speech pattern detected is not recognized by the voice command device 16 as a complete and valid voice command, as explained below, or when keyboard keystroke data are received at the voice command device 16 at or near the time that voice commands are detected or at the time when voice commands are being processed.

It is noted that the switch 56 may be eliminated in alternative embodiments. For example, the voice command device 16 could be turned on and off by actuation of one of the keys of keyboard 25. Similarly, voice activation or constant activation of the voice command device 16 may be provided as an option.

Likewise, the lights 58 and 59 are optional components which are included in the voice command device 16 for providing user friendly compatibility features. Alternatively or in conjunction with the lights 58 and 59, an audible indicator may be included in the voice command device 16 for providing a computer user indications concerning the operation of the voice command device 16 which are similar to those that the lights 58 and 59 may provide, as explained below.

According to the present invention, the processing component 52 is suitably a simple electronic circuit, including a microprocessor or microcontroller, which may be readily designed by one skilled in the art to receive a plurality of input signals, process these input signals according to preprogrammed algorithms stored in a memory, not shown, within the component 52 and provide a plurality of electrical signals at a plurality of outputs. It is to be understood that the functions which may be performed by the processing component 52, as described below, may also be performed using suitably designed firmware.

In a preferred embodiment, the processing component 52 in the voice command device 16 may be designed using well known techniques to: (1) perform speech recognition processing for determining whether the speech patterns of detected speech information correspond to the speech patterns associated with specific, predetermined command words; (2) generate voice keystroke data when complete and valid voice commands are recognized; and, (3) combine the voice keystroke data with keyboard keystroke data, according to the priority scheme described below, to provide an interleaved stream of voice and keyboard keystroke data to the microprocessor unit 18.

It is to be understood that the cost of fabricating the voice command device 16 according to the present invention may be maintained relatively low by including within the voice command device 16 only the limited voice command recognition capabilities which are described below. Of course, alternative embodiments involving more complex voice recognition features may readily be implemented in accordance with this invention. In a preferred embodiment, the voice command device 16 may be suitably designed to recognize speech information representative of voice commands associated with the performance of repetitive keystroke sequences to reduce the necessity for frequent execution of repeated keystroke sequences at a keyboard by a computer user.

By way of example, the present invention is explained below with reference to the use of the voice command device 16 for generating the keystroke data required for moving a cursor within a document undergoing word processing. It is to be understood that the voice command device 16 similarly may be used to achieve cursor movement in other documents, such as, for example, spread sheet application documents and graphics displays. Further, the voice command device 16 may be used where information is to be added to a document a successive number of times, such as would be required for inserting blank lines in a document. Particular presently preferred applications for a voice command device that operates in the manner explained below include a vocational related aid for physically challenged workers or a device for executing the movement control activities involved with computer games, and the like.

As explained in further detail below, the voice command device 16 determines whether a speech pattern detected at the receiver 54 corresponds to that of a specific, predetermined command word included in a voice command. If a valid voice command is received, the voice command device 16 generates keystroke data which achieve the cursor movement that the computer user desired to obtain by issuing the voice command.

In the preferred embodiment, the voice command device 16 may be fabricated as a low cost device which recognizes a limited number of speech patterns which correspond to the speech patterns of specific, predetermined words which may be included in a limited number of voice commands which may be issued by a computer user and recognized by the voice command device 16. For instance, speech patterns recognized by the processing component 52 may consist of the speech patterns of words symbolizing cursor movement, such as, for example, "top," "space," "tab" "page," "right," "left," "up," and "down," and the speech patterns of words which may be associated with cursor movement words in the manner described below, such as, for example, the words "zero," "one," . . . "nine." In addition, the speech patterns of the words may be associated with data information entry, such as, for example, the words "enter," "tab," or "delete."

A suitable voice command further may comprise one or more command words that, when issued alone or in a predetermined sequence, corresponds to a specifically desired cursor movement. For each voice command, the processing component 52 would generate voice keystroke data which are equivalent to the keyboard keystroke data that would have been generated if the cursor movement indicated by the voice command had been implemented by the execution of a corresponding sequence of keystrokes on the keyboard 14.

Moreover, the voice command device 16 may be advantageously designed according to the present invention to recognize a voice command which includes a number word and a cursor movement word, where the number word indicates the number of times that the user desires that the cursor movement associated with the cursor movement word be performed. When the number and cursor movement word are issued in an appropriate sequence as a complete and valid voice command, the processing component 52 generates keystroke data, which corresponds to the key input on the keyboard 14 associated with the indicated cursor movement, and reproduces those keystroke data a corresponding number of times in accordance with the issued number word. For instance, the processing component 52 may be designed to recognize the speech patterns of the words "eight" "right" as constituting a valid voice command for moving the cursor eight places to the right within the same text line, such that the keystroke data corresponding to the "→" key are generated eight times to form a stream of voice keystroke data for implementing that voice command.

The voice command device 16 may suitably be designed to provide voice keystroke data and keyboard keystroke data generated at the keyboard 14 to the micro-processor unit 18 in the following manner. If the switch 56 is placed in the "OFF" position, any keyboard keystroke data which is received at the input port connector 42 is routed directly through the processing component 52 and to the output port 44, and then to the keyboard cable input port connector 36. Keyboard keystroke data, in other words, is routed in the same manner as if the keyboard cable 22 was directly connected to the keyboard cable input port connector 36.

When the user turns the switch 56 to the "ON" position, the processing component 52 energizes the receiver 54 so that the detection of speech information by the voice command device 16 commences. The receiver 54 provides the processing component 52 with electrical data representative of the speech patterns of any detected speech information. According to well known techniques, the processing component 52 converts the speech patterns to data representative of any words that may be included in a voice command when the processing component 52 determines that the detected speech patterns match those of words that are used in voice commands recognized by the voice command device 16.

Figure 3:
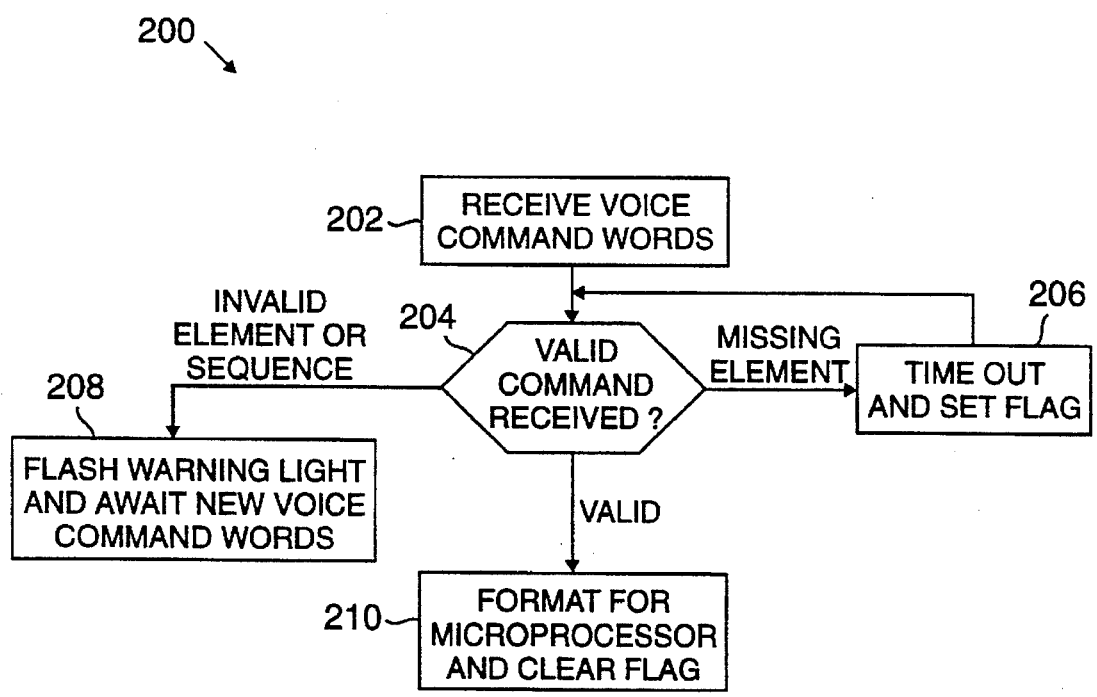
FIG. 3 illustrates a flow diagram for determining whether a complete and valid command has been received at the voice command device, and for generating voice keystroke data specific to a recognized voice command according to the present invention.

A process 200, shown in FIG. 3, illustrates the steps which the processing component 52 may perform to determine if a complete and valid voice command has been provided from the detected speech patterns, and then to generate the corresponding voice keystroke data. In particular, by way of example, the process 200 is described below concerning the steps that the processing component 52 may perform to determine whether the detected speech patterns constitute words of a valid voice command associated with cursor movement as described above, and then to generate voice keystroke data corresponding to the cursor movement represented by the issued voice command.

In step 202, the processing component 52 receives electronic signals corresponding to the speech patterns of the speech information that is detected at the receiver 54. For the sake of example, it is assumed that the voice command device 16 has been designed in a manner such that all number words must be followed by a cursor movement word.

In step 204, the processing component 52, using known speech recognition techniques, determines whether the detected speech patterns correspond to those of the words which comprise a complete and valid voice command which may be recognized by the voice command device 16. A voice command is complete and valid if the speech pattern of each detected word corresponds to a speech pattern which is stored in the memory of the processing component 52, and if these speech patterns are detected in a sequence which corresponds to that expected for the words included in a complete and valid voice command. For instance, the processing component 52 may be designed to determine that speech information provided for moving the cursor a number of places along the same text line constitutes a complete and valid voice command only if the speech pattern of the command word corresponding to the number of places for moving the cursor is detected before the speech pattern corresponding to the cursor movement word is detected. For example, a valid voice command for moving the cursor eight places to the right may require that the word "eight" be stated by the user just prior to the word "right."

Further in step 204, the processing component 52 determines whether a flag has been set indicating that the processing component 52 has already performed step 204 for processing the currently detected sequence of speech patterns which may correspond to the words included in a voice command. As explained below in step 206, a flag is set when the processing component 52 detects the speech pattern corresponding to a recognized number word and a speech pattern for a recognized cursor movement word is not subsequently detected. The occurrence of this condition is referred to below as the reception of a voice command which is missing a word or an element.

If in step 204 the processing component 52 determines that the speech patterns detected indicate that an element which is required for the recognition of a complete and valid voice command is missing from a voice command, the processing component 52 proceeds to perform step 206.

If in step 204 the processing component 52 determines that any detected speech pattern does not correspond to that of a word which may be included as part of a voice command, in other words, that any detected speech pattern is unrecognizable, the processing component 52 proceeds to perform step 208.

If in step 204 the processing component 52 determines that a complete and valid voice command has been received, the processing component 52 proceeds to perform step 210.

In step 206, the processing component 52 pauses for a predetermined interim of time, and then proceeds to perform step 204 for a second time. In the interim, the processing component 52 may receive electronic signals corresponding to the speech patterns of additional words which may be issued by the user and constitute a missing element of a voice command. This time out feature enables the user to pause for a predetermined short time between issuing each of the words that comprise a multiple word voice command. Without this time out feature, speech information which is provided in proper sequence by the user, yet in a slightly time-staggered manner, would be designated by the voice command device 16 as an unrecognizable and invalid voice command. The processing component 52 sets a flag in its internal memory each time it performs step 206. The setting of this flag prevents step 206 from being performed twice for specifically received speech information, in other words, if a missing element is not provided in a timely manner, the previously received speech information which may form a part of the voice command is declared invalid and ignored.

After performing step 206, the processing component 52 once again performs step 204. In step 204, the processing component 52 determines if the flag has been set and if a complete and valid voice command has been received. If the flag is set and the voice command is invalid in any manner, in other words, no additional speech information is provided in the interim while the processor performed step 206, the processing component 52 proceeds to perform step 208.

In step 208, the processing component 52 provides an output signal to illuminate the light 59 to indicate to the user that the speech information detected cannot be recognized as a complete and valid voice command and is not being provided to the microprocessor unit 18 in the form of voice keystroke data. The processing component 52 at this point awaits the reception of new speech information for processing.

In step 210, the processing component 52 generates the voice keystroke data which are equivalent to the cursor movement indicated by the issued voice command. First, the processing component 52 determines whether any of the command words of the voice command include a number word. If a number word is included in the voice command, the processing component 52 reproduces the keystroke data corresponding to the cursor movement word which follows the number word as many times as indicated by the number word provided as part of the voice command. For example, for the voice command "eight" "right," the processing component 52 would generate the voice keystroke data which would have been generated if the user had physically depressed the "→" key on the keyboard 14 eight consecutive times. Further, the processing component 52 clears any flag that may have been set in step 206.

In accordance with the present invention, the processing component 52 suitably transmits the generated voice keystroke data to the microprocessor unit 18 at timed intervals so as not to exceed the standard maximum keyboard output data rate. This arrangement maximizes the utility of the voice command device 16 as a real time, interactive device.

The processing component 52 may also be programmed to combine keyboard keystroke data received at the connector 42 with the voice commands detected by the receiver 54 to provide a stream of interleaved voice and keyboard keystroke data at the output connector 44 in the following manner. In one presently preferred embodiment, the processing component 52 route voice keystroke data to the connector 44 only when keyboard keystroke data are not being received at the connector 42. If keyboard keystroke data are supplied to the voice command device 16 while the processing component 52 is processing speech information and generating voice keystroke data or at approximately the same time that speech information is being detected at the receiver 54, all voice command detection or processing or routing of voice keystroke data to the connector 44 is interrupted. The keyboard keystroke data, instead, are routed to the output 44 by the processing component 52. In this embodiment, keyboard keystroke data at all times have absolute interrupt priority over voice commands in terms of routing to the microprocessor unit 18. When an interrupt condition occurs, the processing component 52 provides a suitable output signal to illuminate the light 59 to alert the user that speech information which is being detected or which was previously provided is being ignored.

The voice command device 16 provides full priority to keyboard keystroke data in order to prevent speech information which was not issued as a voice command, such as the speech information that may be detected when the user or others inadvertently speak while the user is entering information at the keyboard 14, from interrupting the stream of keyboard keystroke data which are being provided to the microprocessor unit 18. Thus, voice commands are supplied to the microprocessor 18 in the form of voice keystroke data only when keyboard keystroke data are not being provided by the user.

On the other hand, if keyboard keystroke data are provided when speech information detection or processing is not occurring, the processing component 52 routes the keyboard keystroke data to the output 44 for further transmission to the microprocessor unit 18 in the same manner as that which would ordinarily have occurred had a voice command device 16 not been included in the keystroke data path between the keyboard 14 and the processor 16. Therefore, the voice command device 16 is transparent in the system 50 when voice commands are not issued by the user.

Alternatively, the voice command 16 may be designed to store in the memory within the processing component 52 keyboard keystroke data which may be received at the voice command device 16 while voice command detection or processing is occurring. In this embodiment, the voice command device 16 would route any stored keyboard keystroke data to the microprocessor unit 18 after the voice keystroke data corresponding to the voice command currently being detected or processed is routed to the microprocessor unit 18.

Although the inventive technique is described above with respect to the addition of the voice command device 16 to the system 10 as a stand alone product, it is to be understood that one skilled in the art may incorporate the features of the voice command device 16 which are described above according to the present invention into the keyboard 14 during the manufacture of this component.

Figure 4:
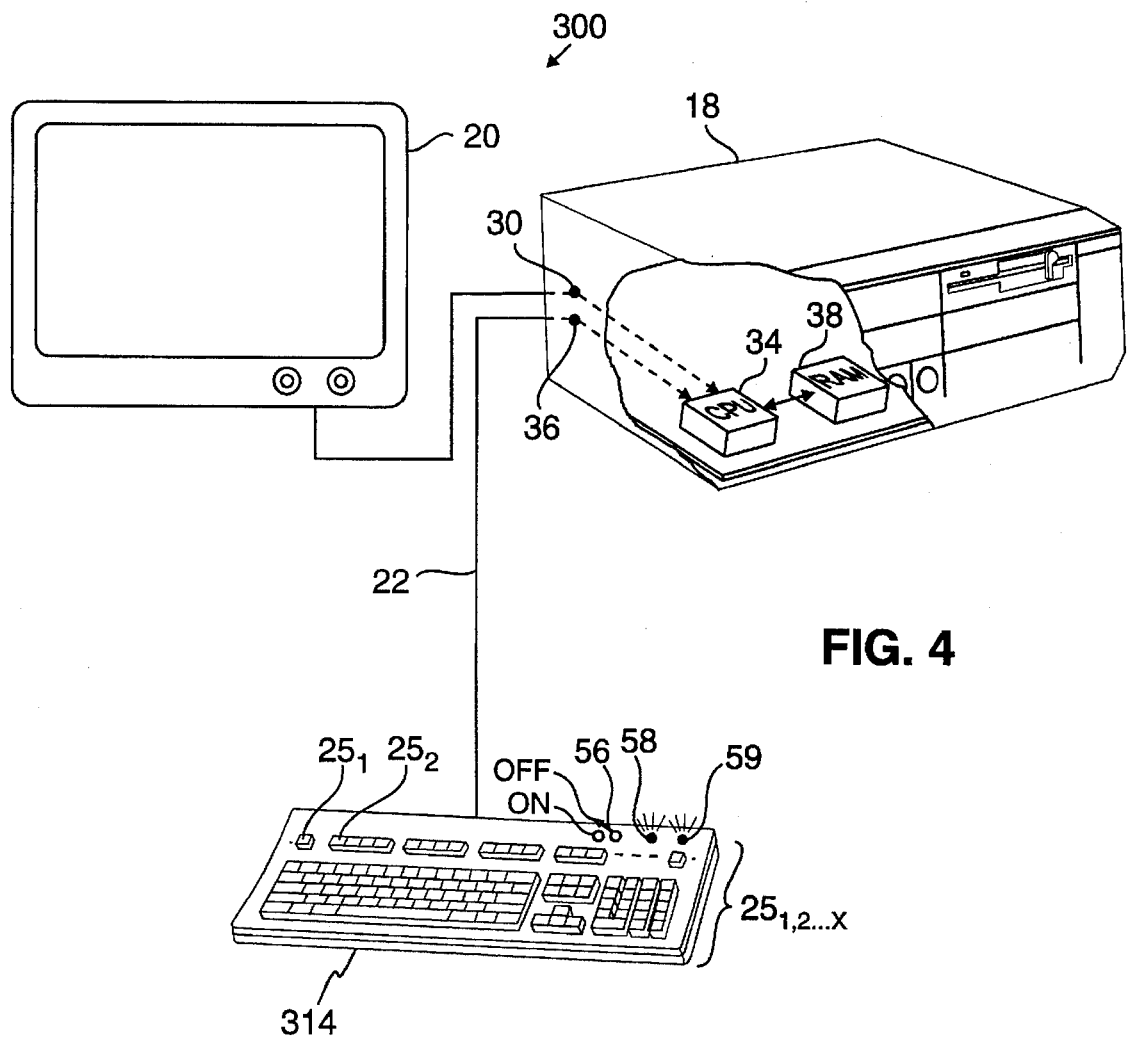
FIG. 4 illustrates the incorporation of voice recognition capabilities in a keyboard according to the present invention.

FIG. 4 shows the connections in a computer system which may be required for including a keyboard fabricated with voice recognition capabilities in that system according to the present invention. FIG. 4 shows a computer system 300 having components which, in many respects, are substantially functionally and structurally identical to those in the system 10. Those components in the system 300 which are preferably structurally identical to the components in the system 10 are referenced in FIG. 4 using the same reference numerals utilized in FIG. 1. Reference should be made to the description of the system 10 above for a detailed explanation concerning the structure and operation of components in the system 300 which are identical to those used in the system 10.

The system 300 comprises a keyboard 314, a microprocessor unit 18, a standard keyboard cable 22 and a video display monitor 20 which is connected to the microprocessor unit 18. The keyboard 314 is similar to the keyboard 14 in most respects except that it includes voice recognition capabilities, and is connected to the keyboard cable input port connector 36 of the microprocessor unit 18 in an ordinary manner by the standard keyboard cable 22. This connection arrangement allows for easy and low cost installation of voice recognition capabilities in an existing computer system that only requires the purchase of a keyboard that includes operational components that perform the voice recognition functions, which are described above. In addition, the keyboard 314 may also include the lights 58 and 59 and the switch 56 for performing preferably identical functions as in the voice command device 16.

It is to be understood that the embodiments and variations shown and described above are illustrative of the principles of this invention only and that various modifications may be implemented by those skilled in the art without departing from the scope and spirit of the invention.

I claim:

1. A computer system that generates keystroke data from the detection of speech patterns, comprising:

a keyboard for supplying keyboard keystroke data on a keyboard cable attached to the keyboard;

a microprocessor unit having a standard keyboard cable input port connector;

a low cost voice command device in a self-contained housing having a limited voice command recognition capability, to reduce the necessity for frequent execution of repeated keystroke sequences at the keyboard by a computer user, said low cost voice command device having a keystroke data input and output port, a memory for storing a predetermined number of plain English voice command words associated with the performance of repetitive multiple keystroke sequences said voice command words comprising cursor movement control words and data information entry word, a receiver for detecting speech patterns and a processing component for generating voice keystroke data, wherein said keyboard cable connects said keyboard to said input port of said voice command device;

a standard computer cable connecting said output port of said voice command device to said standard keyboard cable input port of said microprocessor unit, wherein said voice command device receives keyboard keystroke data at the input port and the processing component generates voice keystroke data based on the recognition of the speech patterns of a voice command word which is provided by a user and detected at the receiver, said voice command word being associated with the performance of a repetitive keystroke sequence on the keyboard, wherein the voice keystroke data generated are equivalent to the keyboard keystroke data which would have been generated at the keyboard had the user depressed a corresponding sequence of keys on the keyboard, and wherein said voice command device provides an interleaved voice and keyboard keystroke data stream to the output port for routing to the microprocessor unit.

2. The system of claim 1, wherein the voice command device obtains electrical power for operation which is transmitted over the cable connecting the voice command device to the keyboard cable input port of the microprocessor unit.

3. The system of claim 1, wherein the voice command device further comprises a switch for activating the voice recognition operating feature.

4. The system of claim 1, wherein the voice command device further comprises an indicator light for indicating to the user that voice keystroke data have not been provided to the microprocessor unit when speech patterns are detected at the receiver.

5. The system of claim 1, wherein the recognized voice command comprises a number word and a command word, and wherein the voice command device generates voice keystroke data which are equivalent to the keyboard keystroke data which would have been generated by the physical depression of a key on the keyboard, corresponding to the command movement word, the same number of times as indicated by the value of the number word.

6. The system of claim 5, wherein the command word is a cursor movement word.

7. The system of claim 5, wherein the command word is a data entry word.

8. The system of claim 1, wherein voice keystroke data are included in the interleaved stream only when keyboard keystroke data are not being received at the voice command device, such that keyboard keystroke data are provided in the interleaved stream with absolute priority over voice keystroke data associated with voice commands.

9. The system of claim 5, wherein voice keystroke data are included in the interleaved stream only when keyboard keystroke data are not being received at the voice command device, such that keyboard keystroke data are provided in the interleaved stream with absolute priority over voice keystroke data associated with voice commands.

10. The system of claim 1, wherein keyboard keystroke data which is received at the voice command device during voice command detection or processing is included in the interleaved stream after voice keystroke data generated based on the detected or processed voice command is provided for routing to the microprocessor unit in the interleaved stream.

11. A low cost apparatus comprising:

a first input for receiving keyboard keystroke data generated by a keyboard;

a receiver for detecting speech information;

a processing component for determining whether the speech pattern of any detected speech information corresponds to that of a plain English command word included in a limited number of predetermined voice command;

a memory for storing said limited number of predetermined voice commands, said predetermined voice commands comprising cursor movement control words and data information entry words;

wherein the command word is associated with the performance of a repetitive multiple keystroke sequence on the keyboard, and wherein said processing component generates voice keystroke data based on the recognition of a voice command and combines voice keystroke data with keyboard keystroke data to provide an interleaved keystroke data stream; and an output port upon which the interleaved keystroke data stream may be supplied for routing to a keyboard cable input port connector of a microprocessor unit in a computer system.

12. The apparatus of claim 11, wherein the voice command comprises a number word and a cursor movement word, and wherein the processing component generates voice keystroke data which are equivalent to the keyboard keystroke data which would have been generated by the physical depression of a key on the keyboard, corresponding to the cursor movement word, the same number of times as indicated by the value of the number word.

13. The apparatus of claim 11, wherein the processing component processes and detects speech information for inclusion as voice keystroke data in the interleaved stream only when keyboard keystroke data are not being received at the first input, such that keyboard keystroke data are provided in the interleaved stream with absolute priority over voice keystroke data associated with voice commands.

14. The apparatus of claim 11, wherein the receiver comprises a microphone.

15. The apparatus of claim 11 further comprising a switch for controlling voice recognition by the apparatus.

16. The apparatus of claim 11 further comprising an indicator light for indicating that detected speech patterns have not been provided as converted voice keystroke data to the output port.

17. A method of using speech recognition techniques for generating keystroke data based on the detection of a limited set of voice commands comprising cursor movement control words and data information entry words instead of the execution of a repetitive multistroke keystroke sequence on a keyboard, comprising the steps of:

detecting the speech pattern of plain English speech information which is voiced by a computer user;

determining whether the detected speech pattern matches a pattern of a predetermined word which is included in a voice command from the limited set of voice commands; and, generating keystroke data representative of the words in the voice command whose speech pattern is recognized, wherein the generated keystroke data are equivalent to the multistroke keystroke data which a computer user would have generated at the keyboard had the user depressed a corresponding sequence of keys on the keyboard.

18. The method of claim 17, wherein the voice command comprises a number word and a cursor movement word, and wherein the step of generating keystroke data further comprises the steps of generating voice keystroke data which are equivalent to the keystroke data which would have been generated by the physical depression of a key on the keyboard, corresponding to the cursor movement word, the same number of times as indicated by the value of the number word.

19. The method of claim 17, further comprising the step of providing a stream of interleaved keystroke data comprised of keystroke data generated based on the recognized voice commands and the keyboard keystroke data which may be supplied from the keyboard.

20. The method of claim 19, further comprising the step of including voice keystroke data in the interleaved stream keystroke data only when keyboard keystroke data is not supplied from the keyboard, such that keyboard keystroke data are provided in the interleaved stream with absolute priority over voice keystroke data associated with voice commands.

21. A computer system that generates keystroke data from the detection of speech patterns, comprising;

a microprocessor unit having a standard keyboard cable input port connector;

a keyboard for supplying keyboard and voice keystroke data on a keyboard cable attached to the keyboard, said keyboard comprising a receiver for detecting speech patterns and a processing component for generating voice keystroke data, wherein said keyboard cable connects said keyboard to said standard keyboard cable input port of said microprocessor unit, wherein said keyboard comprises key inputs for generating keyboard keystroke data, wherein said processing component generated voice keystroke data based on the recognition of speech patters of a plain English voice command word which is provided by a user and detected at the receiver, said voice word command being associated with the performance of a repetitive multistroke keystroke sequence on the keyboard and being selected from a group of cursor control words comprising the words "top", "space", "tab", "page", "right", "left", "up" and "down", from a group of data information entry words "enter", "tab", or "delete," or a number word, wherein the voice keystroke data generated are equivalent to the keyboard keystroke data which would have been generated at the keyboard had the user depressed a corresponding sequence of keys on the keyboard, and wherein said keyboard provides an interleaved voice and keyboard keystroke data stream to the keyboard cable for routing to the microprocessor unit.

22. The system of claim 21, wherein the keyboard obtains electrical power for operation from the keyboard cable connecting the keyboard to the keyboard cable input port of the microprocessor unit.

23. The system of claim 21, wherein the keyboard further comprises a switch for activating the voice recognition operating feature.

24. The system of claim 21, wherein the keyboard further comprises an indicator light for indicating to the user that voice keystroke data have not been provided as converted to the microprocessor unit when speech patterns are detected at the receiver.

25. The system of claim 21, wherein the recognized voice command comprises a number word and a command word, and wherein the keyboard generates voice keystroke data which are equivalent to the keyboard keystroke data which would have been generated by the physical depression of a key input on the keyboard, corresponding to the command movement word, the same number of times as indicated by the value of the number word.

26. The system of claim 21, wherein the command word is a cursor movement word.

27. The system of claim 21, wherein the command word is a data entry word.

\* \* \* \* \*